US007021916B2

(12) United States Patent
Correia

(10) Patent No.: US 7,021,916 B2
(45) Date of Patent: Apr. 4, 2006

(54) PRESS AND MOULD FOR PRECAST CEMENTITIOUS ARTICLE

(75) Inventor: Horacio Correia, Lachenaie (CA)

(73) Assignee: Rinox, Inc., Terrebonne (CA)

(*) Notice: Subject to any disclaimer, the term of this patent is extended or adjusted under 35 U.S.C. 154(b) by 248 days.

(21) Appl. No.: 10/322,340

(22) Filed: Dec. 17, 2002

(65) Prior Publication Data

US 2003/0147986 A1 Aug. 7, 2003

(30) Foreign Application Priority Data

Dec. 19, 2001 (CA) .................................. 2365786

(51) Int. Cl.
*B29C 35/02* (2006.01)

(52) U.S. Cl. ..................... 425/116; 425/353; 425/412; 425/DIG. 44; 264/313

(58) Field of Classification Search ................ 425/116, 425/117, 352–355, DIG. 124, 412–422, DIG. 44; 264/313, 333

See application file for complete search history.

(56) References Cited

U.S. PATENT DOCUMENTS

| | | | | |
|---|---|---|---|---|
| 4,266,921 | A * | 5/1981 | Murray | 425/412 |
| 5,330,339 | A * | 7/1994 | Gatarz et al. | 425/116 |
| 5,415,828 | A * | 5/1995 | Watanabe et al. | 425/405.2 |
| 5,935,617 | A * | 8/1999 | Uchida et al. | 425/134 |
| 6,638,460 | B1 * | 10/2003 | Wahl | 425/388 |

* cited by examiner

*Primary Examiner*—Duane Smith
*Assistant Examiner*—Thu Khanh T. Nguyen
(74) *Attorney, Agent, or Firm*—Ryan Kromoholz & Manion, S.C.

(57) ABSTRACT

Disclosed herein is a press and mould apparatus for moulding cementitious articles comprising a precast mould and a press head having a pressing surface and being moveable between precast mould engaging and disengaging positions, wherein the pressing surface comprises a coating of deformable and resilient material such as urethane. Also disclosed is a process for moulding building blocks. This process comprising filling a precast mould with material, such as concrete, this is to be pressed; and pressing the material with a pressing surface comprising a deformable and resilient coating so as to solidify the material into a green shape ready for cutting.

10 Claims, 2 Drawing Sheets

PRESS AND MOULD FOR PRECAST CEMENTITIOUS ARTICLE

FIELD OF THE INVENTION

The present invention relates to a press and mould for precast concrete articles, such as tiles, blocks or stones.

BACKGROUND OF THE INVENTION

Precast concrete articles such as tiles, blocks or stones are well known and widely used. It is common to use these for indoor and outdoor landscaping, paved tracks and roads, wall retaining systems and the like. These articles are provided in a variety of configurations and sized and are usually made in precast moulds. It is standard to press slightly humid cementitious mixture in a precast mould with sufficient pressure in order to solidify it into a green shape. The green shape is then cured in a drying oven.

Standard press and mould arrangements provide a table on which a delimiting gate mould is placed. The gate mould is filled with the humidified precast mix. A vertical press is then hydraulically lowered on the precast mix. The resulting green shapes are moulded between the gate mould and the vertical press. The moulding surface of the vertical press is used to imprint design elements on the top surface of the green shapes.

Prior art presses are generally provided with a metallic pressing surface. One problem with such presses is that if too much pressure is exerted on the precast mix, the resulting article will be destroyed by excessive compression, or at the very least become fragile and lose its design definition. This is especially true when making thin articles such as tiles.

There is an ongoing need for providing thin concrete articles such as tiles having a better design and definition and a better physical and mechanical properties.

SUMMARY OF THE INVENTION

In accordance with the present invention, there is provided a press and mould device comprising:

a precast mould; and a press head having a pressing surface and being moveable between precast mould engaging and disengaging positions, wherein the pressing surface comprises a coating, on at least a major portion of said pressing surface, of deformable and resilient material.

Preferably, the deformable and resilient material is a resinous compound such as urethane or rubber. More preferably the resinous compound is urethane.

Advantageously, the pressing surface comprises a metallic periphery defining a one or more metallic central cavities carrying the coating of deformable and resilient material.

In accordance with another object of the present invention there is provided a method for moulding precast concrete articles, said method comprising: filling a precast gate mould disposed on a moulding table with a precast mix of cementitious material that is to be pressed; and pressing the precast mix with a pressing surface comprising a coating of, on at least a major portion of said surface, of deformable and resilient material so as to shape and solidify the precast mix into a green shape ready for curing.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Figure 1:
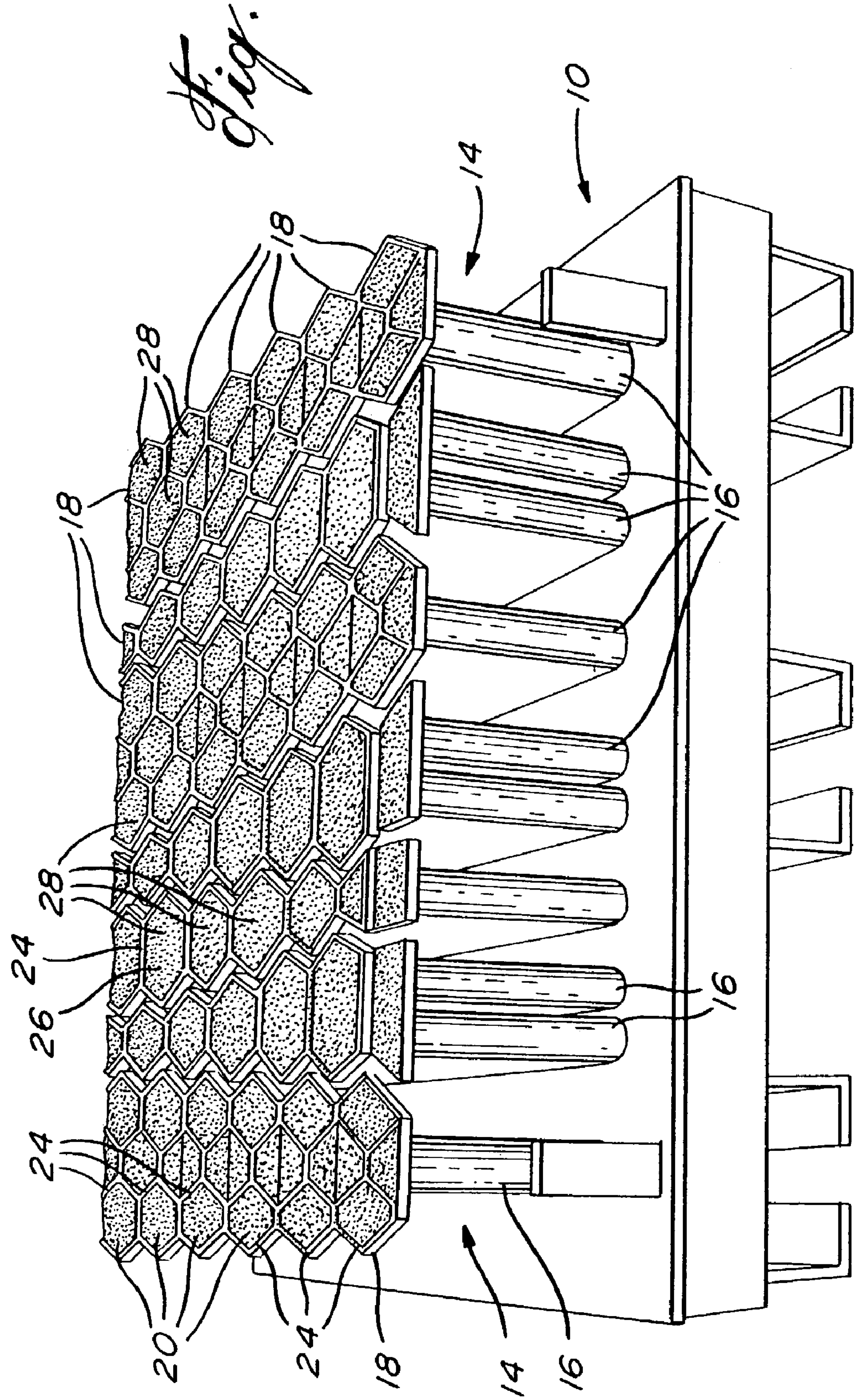
FIG. 1 is a perspective view of a press of the present invention.
Figure 2:
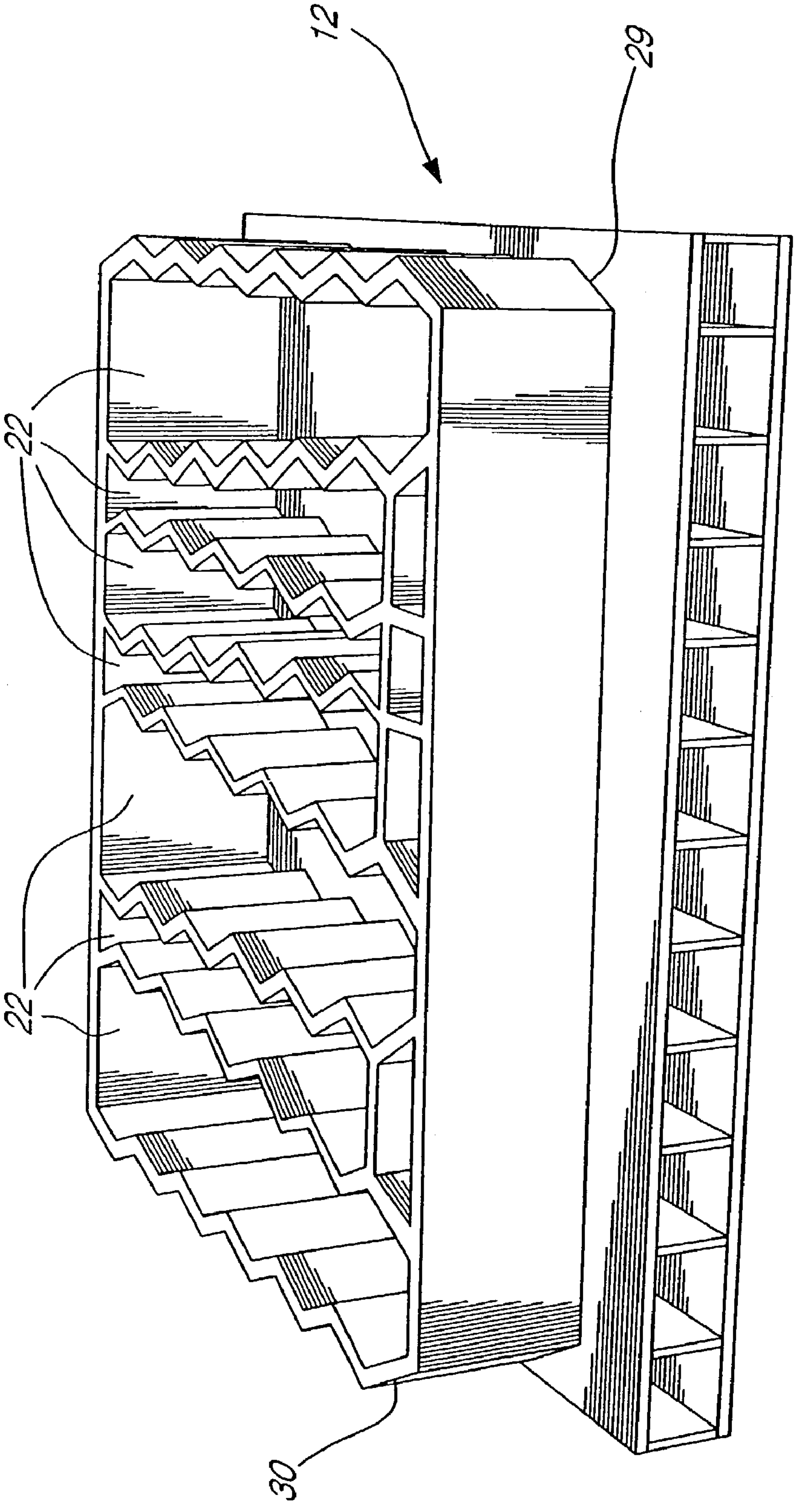
FIG. 2 is a perspective view of a gate mould carrier corresponding to the press of FIG. 1.

FIGS. 1 and 2 show an example of a press 10 and corresponding gate mould 22 of the present invention.

Press 10 carries a number of press bodies 14 having an extension member 16 which carries at its free end a press head 18 provided with a pressing surface 20. The mould table 12 is provided with a number of precast gate moulds 22. Press heads 18 and precast gate mould 22 may come in a variety of configurations and sizes in order to create a variety of green shapes. Obviously, the press head 18 and precast mould 22 of the same press mould device will be provided with corresponding shapes. For example, the resulting block produced by the press head 18 of FIG. 1 with the corresponding gate mould 22 produces paving stones or grass paving stones.

Green shapes are obtained by pouring slightly humid cementitious aggregates into each gate mould 22. Usually, a series of mould tables 12 having thereon one or more gate moulds 22, will be placed on a flat rail overlying turning rollers and each mould table 12 will be positioned, in turn, directly under press 10. A standard hydraulic actuator will drop press 10 unto the gate moulds 22. Typically, press 10 will be moveable along a vertical axis. In this way, each press head 18 will engage a corresponding gate mould 22. The gate moulds 22 are open at both ends with one end 29 resting on mould table 12 and the other end 30 exposing the contents therein and allowing the pressing surface 20 of a press head 18 to apply sufficient pressure to the concrete in order to solidify it into a green shape.

The pressing surface 20 is made of strong metallic material and has a periphery 24 defining a central channel or cavity 26 for receiving, in most cases by injection, a deformable and resilient material 28. Preferably, the deformable and resilient material 28 is urethane or any other like resinous compound. Since the periphery 24 is made of metal it will act as a support for the urethane 28 during the pressing so as to avoid damaging the urethane.

Hence, when the pressing surface 20 will apply pressure unto the cementitious material in precast mould 22, it will be able to press the green shape with even and gradual pressure as the urethane or like material deforms under pressure. This will allow a greater amount of pressure to be exerted on the green shape so as to create a green shaped article which is thinner and of greater density than was heretofore possible. Moreover, the design definition on the top of the green shape will be superior to prior art achievements. Finally, because of the urethane or like material, the tendency of the green shape to stick to the press head upon retraction of the press head will be lessened. This, in turn, will allow the use of more humid precast mixes of cementitious material and allow higher density of green shapes.

Although the present invention has been described hereinabove by way of preferred embodiments thereof, it can be modified, without departing from the spirit and nature of the subject invention as defined in the appended claims.

I claim:

1. A press and mould device for moulding precast cementitious articles comprising:

a precast mould for receiving cementitious material therein; and a press head having a pressing surface and being moveable between precast mould engaging and disengaging positions, said pressing surface, comprising a coating of deformable and resilient material, said deformable and resilient material being bordered by a non-deformable periphery;

wherein when said pressing surfaces is in said present mould engaging position it is so pressed against the cementitious material in said precast mould as to deform said deformable and resilient material thereby moulding a cementitious article and imprinting a design defined by said periphery on the top of the cementitious article.

2. A press mould device according to claim 1 wherein said deformable and resilient material is a resinous compound.

3. A press mould device according to claim 2 wherein said resinous compound is urethane.

4. A press mould device according to claim 1 wherein said non-deformable periphery is made of metallic material.

5. A press mould device according to claim 1 wherein said periphery defines central cavity carrying said coating of deformable and resilient material.

6. A press and mould device according to claim 1 wherein said pressing surface comprises a periphery comprising a patterned design and defining a plurality of cavities carrying said coating of deformable and resilient material.

7. A press and mould device according to claim 1 wherein the precast mould is positioned directly under the press head, said press head being moveable along a vertical axis.

8. A press and mould device according to claim 1 wherein said press and mould device further comprises an actuator mounted to the press head for moving said press head between precast mould engaging and disengaging positions.

9. A press and mould device according to claim 1 wherein said press head and said mould are correspondingly shaped.

10. A press of the type used for pressing and moulding precast cementitious articles in a precast mould comprising:

a press head having a pressing surface and being moveable between precast mould engaging and disengaging positions;

said pressing surface comprising a coating of deformable and resilient material;

said deformable and resilient material being bordered by a non-deformable periphery, wherein when said pressing surface is in said precast mould engaging position it so pressed against the cementitious material in said precast mould as to deform said deformable and resilient material thereby moulding a cementitious article and imprinting a design defined by said periphery on the top of the cementitious article.

* * * * *

UNITED STATES PATENT AND TRADEMARK OFFICE

CERTIFICATE OF CORRECTION

PATENT NO. : 7,021,916 B2
APPLICATION NO. : 10/322340
DATED : April 4, 2006
INVENTOR(S) : Horacio Correia It is certified that error appears in the above-identified patent and that said Letters Patent is hereby corrected as shown below:

Column 3, line 8, after “surface” delete -- , -- (comma)

Column 3, line 12, delete “surfaces” and substitute -- surface --

Column 3, line 26, after “defines” insert -- a --

Column 4, line 22, after “it” insert -- is --

Signed and Sealed this

Eighth Day of August, 2006

JON W. DUDAS

*Director of the United States Patent and Trademark Office*